3,293,193
CHEMICAL PROCESS FOR PRODUCTION OF
POLYOXYETHYLENE COMPOUNDS
Stanley E. Krahler, Wilmington, and Frank J. Marascia, Newark, Del., assignors to E. I. du Pont de Nemours and Company, Wilmington, Del., a corporation of Delaware
No Drawing. Filed Apr. 9, 1963, Ser. No. 271,580
8 Claims. (Cl. 260—2)

This invention relates to a new and useful process for preparing polyoxyethylene compounds and, more particularly, polyethylene glycols and monoethers thereof having an average molecular weight in the range of 16,000 to 35,000.

It is well known that polyoxyethylene compounds can be produced by condensing ethylene oxide with a hydroxyl-containing organic compound, such as ethylene glycol, in the presence of a suitable condensation catalyst such as sodium or sodium methoxide. The products thus obtained are mixtures of individual polymers of similar chemical structure frequently having a wide variation in chain length and molecular weight. Among the large number of uses for such ethylene oxide condensation products is their incorporation in synthetic linear hydrophobic fibers of the nylon and polyester types as antistatic agents. For this use, it is desirable to use condensation products containing polymers of moderately high molecular weight (e.g., 16,000 to 35,000) and of substantially the same chain length. In such condensation products where the chains are of substantially uniform length, the average molecular weight, as determined from the product's hydroxyl number, approaches theoretical as calculated from the ethylene oxide consumed per mol of hydroxy compound. On the other hand, if the average molecular weight is significantly below theoretical, it indicates that an appreciable amount of shorter chain polymers have formed in the condensation reaction. The presence of lower molecular weight components is undesirable for antistatic uses since they tend to plasticize nylon fibers and cause them to stick together during processing. Prior to the present invention, the processes available for preparing ethylene oxide products in the desired molecular weight range have been troublesome, or the products themselves have been deficient as anti-static agents due to the presence of low molecular weight components. The production of polyethylene glycols having a molecular weight of 16,000 to 35,000 using such conventional polymerization promoters as sodium hydroxide and sodium methoxide is theoretically possible, provided sufficient ethylene oxide is used to compensate for the water or methanol formed by the reactions:

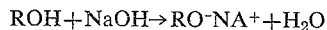
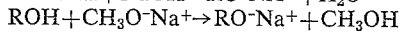

and provided the total amount of promoter to be used is added at the start of the polymerization. In practice, the promoter is added in increments as needed to promote the polymerization in order to minimize the oxidation induced by the sodium oxy group. By this procedure, water is liberated and new polymer chains are initiated, conditions that necessarily lead to low molecular weight material. Another promoter for ethylene oxide condensation reactions is metallic sodium. Although the incremental addition of sodium has no adverse effect on the molecular weight distribution in the final product, it is sluggish in initiating the formation of polymers having a molecular weight much above about 2500.

The present invention is an improvement in the production of polyoxyethylene compounds having an average molecular weight in the range of 16,000 to 35,000 by the condensation of ethylene oxide with an organic hydroxy compound. Hydroxy compounds used may be one or more compounds from the group consisting of alcohols, phenols, and ethers of polyethylene glycol. The improvement comprises using in the condensation reaction a substantially anhydrous atmosphere, sodium hydride as the reaction promoter, ethylene oxide having a water content of less than 0.005%, and one of the above-specified hydroxy compounds with a water content of less than 0.2%. The reactants are brought together in the final proportions of 1 mol of the hydroxy compound or a mixture of hydroxy compounds which is the stoichiometric equivalent of 1 mol, about 360–800 mols of the ethylene oxide, and about 0.005 mol to 0.6 mol of sodium hydride. Reaction temperatures range from about 100°–140° C. After the condensation product is formed, the reaction mixture is acidified to convert any sodium oxy groups in the polymers to hydroxyl groups. This step is well known in the art. The improved process of this invention produces ethylene oxide condensation products in the molecular weight range of 16,000 to 35,000, and the individual polymers in such products are of substantially the same chain length.

The water content of the ethylene oxide is critical in this invention. Although the water content of commercially available ethylene oxide is usually not greater than 0.3% and causes no difficulty in most ethoxylation operations, it has been found that to produce condensation products according to this invention, the water content of the ethylene oxide must be less than 0.005% (50 parts per million). Water causes side reactions whereby ethylene oxide chains are terminated at lower than desired length, thus resulting in the formation of the shorter chain polymers which are undesirable in materials that are to be used as anti-static agents. Thus, the water content of the ethylene oxide must be less than 0.005% and preferably less than 0.002%.

An effective and convenient way to dry the ethylene oxide to obtain material with a moisture content of less than 50 p.p.m. is to pass ethylene oxide gas through a bed of pellets of crystalline synthetic potassium aluminum silicate, referred to as potassium zeolite, having an effective pore size of three angstroms. This drying material is described in U.S. Patent 2,882,243. The pore size of this adsorbent permits the water to be adsorbed without retention of the ethylene oxide. A sodium zeolite having a pore size of four angstroms is unsatisfactory, for while it adsorbs water readily, it also adsorbs and degrades ethylene oxide. Other drying agents such as soda-lime and silica gel give trouble because the ethylene oxide is absorbed and tends to polymerize on the surface of these desiccants or is degraded.

Since water causes side reactions and results in the formation of lower molecular weight polymer chains, the water content of the other reactants is also critical. However, in the case of sodium hydride, it is usually not necessary to take any particular precautions with respect to its water content since sodium hydride itself is particularly sensitive to water, and it is usually stored in a non-aqueous medium to protect it from moisture. Under normal circumstances, commercial sodium hydride will not introduce a deleterious amount of water into the reaction system. With respect to the water content of the organic hydroxy compound, it has been found that this water content should not exceed 0.2% by weight. It can be seen that the amount of water that is tolerable in the hydroxy compound is somewhat greater than the amount which can be tolerated in the ethylene oxide. It is believed that any water in the reaction system reacts with the ethylene oxide to form ethylene glycol. Then, such ethylene glycol, upon reaction with sodium hydride in the manner explained hereinafter, provides a site for the formation of a new chain. Greater water tolerance in the hydroxy compound may be due to the fact that since all of the hydroxy compound is placed in the reaction zone at the start of the reaction, ethylene glycol quickly forms and reacts in the same manner as the hydroxy compound. On the other hand, ethylene glycol formed from water in ethylene oxide which is introduced at a later stage of the process may disturb the chain-extending reaction and result in the formation of shorter chain polymers. Another factor to be considered is that the amount of hydroxy compound used compared to the ethylene oxide on a molar basis is relatively small (360:1 to 800:1), and this may in part account for the greater water tolerance in the hydroxy compound.

The removal of water from the hydroxy compound does not present as difficult a problem as the removal of water from ethylene oxide. Conventional methods such as direct distillation, azeotropic distillation, and bubbling dry nitrogen through the material can be used. One skilled in the art can readily select the best method for the particular hydroxy compound which is used. It is also possible to dry hydroxy compounds such as methanol, ethanol, and n-propanol with a molecular sieve (see U.S. Pat. 2,983,763).

Another critical feature of this invention is the use of sodium hydride to initiate and promote the condensation reaction. It has been found that this material causes the condensation to continue smoothly and rapidly at moderate temperatures, even at levels of molecular weight in the range of 10,000 to 20,000 and higher. The initiation of the reaction at temperatures well below those where thermal degradation of the ethylene oxide polymer occurs is an important feature of the new process. In addition, sodium hydride introduces no harmful side reactions. It is believed that the sodium hydride causes condensation by first reacting with a portion of the hydroxy compound to form anionic nuclei for the propagation of ethylene oxide chains as represented by the equation:

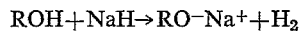

$$ROH + NaH \rightarrow RO^-Na^+ + H_2$$

Chain propagation then occurs as follows:

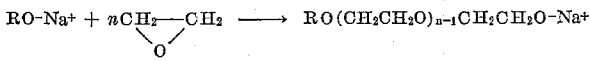

$$RO^-Na^+ + nCH_2\text{---}CH_2 \longrightarrow RO(CH_2CH_2O)_{n-1}CH_2CH_2O^-Na^+$$

Sodium hydride is readily available as a dispersion in white mineral oil which makes the material easy to measure and to handle. The total amount of sodium hydride used will vary from 0.005 mol to 0.6 mol per mol of hydroxy compound. It is preferable to add the sodium hydride in increments. The actual incremental amounts will depend upon such factors as the stage of the polymerization (less initiator being needed in the early stages than in the later ones), the reactivity of the hydroxy compound (the condensation of ethylene oxide with a hindered phenol proceeds at a slower rate under the same conditions than with a phenol that is unsubstituted in the ortho positions) and the temperature of the reaction.

Once the sodium hydride forms with the hydroxy compound an initiating center for the condensation, and under the conditions of this invention, chain growth occurs until the ethylene oxide introduced and the starting hydroxy compound are consumed to produce a polyoxyethylene compound having a molecular weight which is essentially the sum of the mols of ethylene oxide added per mol of hydroxy compound. During the condensation, chain growth will be temporarily interrupted as a hydrogen atom is transferred from an unreacted molecule of hydroxy compound to the end of a growing chain and a new anionic initiating center is produced. A chain so terminated will later become reactivated for further chain growth by similar transfer of its terminal hydrogen atom to a growing chain which in turn becomes terminated. The amount of sodium hydride added governs the number of nuclei formed from which chain growth can occur and thus controls the condensation rate. It is common practice to use sodium hydride at the outset of a condensation in concentrations within the range of 0.005 mol to 0.02 mol per mol of hydroxy compound, and to add sodium hydride in increments as polymerization progresses and the need for stimulating the reaction is observed. The whole of the sodium hydride added need not exceed about 0.6 mol of hydroxy compound.

The hydroxy compound used for condensation with the ethylene oxide may be either an alcohol, a phenol, or a low molecular weight condensation product of ethylene oxide with organic hydroxy compounds. Examples of alcohols which may be used include: methanol, ethanol, 1-propanol, 2-propanol, 1-butanol, 2-butanol, isobutyl alcohol, 1-hexanol, 3-hexanol, ethylene glycol, benzyl alcohol 3,5-di-tert.-butyl-4-hydroxybenzyl alcohol, p-tert.-butylbenzyl alcohol.

Among the phenols that may be used in this invention are the following representative compounds: phenol, p-ethylphenol, p-hexylphenol, p-nonylphenol, p-dodecylphenol, 4-sec-butyl-2,6-di-butyl phenol, o-cresol, 4,6-di-tert.-butyl-o-cresol, m-cresol, 6-tert.-butyl-m-cresol, p-cresol, 2,6-di-tert.-butyl-p-cresol, 2,3-xylenol, 2,6-xylenol, mesitol, 4,4'-butylidenediphenol, 4,4'-isopropylidenediphenol, 4,4'-butylidenebis(6-tert.-butyl-m-cresol), 2,2'-ethylidenebis(6-tert.-butyl-p-cresol), 2,2-methylenebis(6-tert.-butyl-p-cresol), 4,4'-propylidenebis(6-tert.-butyl-m-cresol), 4,4' - propylidenedi - 2,3 - xylenol, 6,6' - isobutylidenedi-2,4-xylenol, 4,4'-methylenedi-2,6-xylenol.

Also, it is possible to use thiodiphenols, for example: 4,4' - thiodiphenol, 4,4' - thiobis(6 - tert. - butyl - m-cresol).

When the hydroxy compound is ethylene glycol, the resultant product after acidification is a polyethylene glycol. When the hydroxy compound is monohydric, the final polyoxyethylene compound is a mono ether of a polyethylene glycol capped at one end by the R group. In the instance where the hydroxy compound is a bisphenol, the compound reacts with 2 molecules of sodium hydride and the residual bifunctional group appears as a linkage within an otherwise polyethylene ether chain. An additional feature of this invention is that hydroxy compounds possessing antioxidant properties such as the hindered phenols, illustrated by 2,6-di-tert.-butyl-p-cresol and the corresponding alkylidene bis-phenols can be used and thus serve to introduce into the polymer chain a functional group which protects the polyoxyethylene compound against attack by oxygen. A common practice is to employ in place of a single hydroxy compound a mixture of hydroxy compounds which consists of from 0.75 part to 0.95 part of ethylene glycol or a p-alkylphenol and from 0.25 part to 0.05 part of a phenol having at least one tert.-butyl group in an ortho position, the foregoing parts being on a molar basis. Such a scheme permits attainment of the desired molecular weight product with a narrow distribution of the polymer chain lengths and with the added protection against degradation by oxidation provided by the minor amount of the o-tert.-butyl phenol.

The preferred hydroxy compounds taken singly are ethylene glycol and p-nonylphenol. The preferred mixtures of hydroxy compounds are ethylene glycol in combination with 4,4'-butylidene-bis(6-tert.-butyl-m-cresol) and p-nonylphenol in combination with 2,6-di-tert.-butyl-p-cresol.

In addition to the above hydroxy compounds, partial ethers or low molecular weight condensation products of the hydroxy compounds and ethylene oxide (molecular weight up to about 3000) may be used together with sodium hydride as reactants with ethylene oxide to form the desired polyoxyethylene compounds. Examples of such partial ethers are:

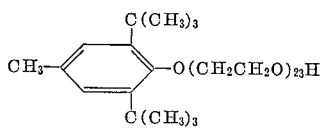

and

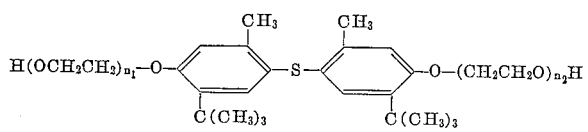

wherein $n_1+n_2=36$. These low molecular weight polyoxyethylene compounds may be used singly or in mixtures with any of the aforementioned ROH compounds.

Preferred hydroxy compounds are those selected from the group consisting of (a) a compound having the formula ROH wherein R is a member of the group consisting of 2-hydroxyethyl, $C_1$ to $C_6$ alkyl, phenyl, and alkyl-substituted phenyl having the formula

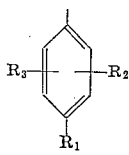

wherein $R_1$ is a member of the group consisting of hydrogen, $C_1$ to $C_{12}$ alkyl, —$CH_2OH$,

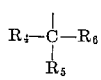

and —S—$R_5$ wherein $R_4$ and $R_6$ are members of the group consisting of hydrogen and $C_1$ to $C_3$ alkyl, $R_5$ is

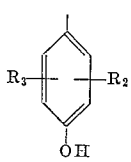

and $R_2$ and $R_3$ in the two foregoing formulas are members of the group consisting of hydrogen and $C_1$ to $C_4$ alkyl, and (b) mixtures of the above ROH compounds in amounts such that the total amount of the components of the said mixture equals the stoichiometric equivalent of one mol of any compound taken singly. A representative number of such compounds have been set forth.

Conventional equipment of the type that has been previously employed in ethylene oxide condensation reactions may be used in the present invention. This usually consists of a standard stainless steel pressure vessel equipped with means for introducing reactants, removing end products out of contact with the outside atmosphere, and with means for controlling temperature and pressure. A diagram of an apparatus that may be used is found in an article by J. D. Malkemus in J. Am. Oil Chemists' Society, vol. 33, p. 571 (1956).

Substantially anhydrous conditions may be established by sweeping the reaction vessel with dry nitrogen. The vessel is then charged with a selected hydroxy compound and a relatively small amount of sodium hydride, the temperature is raised to reaction temperature, and dry ethylene oxide is pumped in over a period of several hours while holding the temperature and pressure within a specified range. The ethylene oxide may be in the gaseous or liquid state as it enters the reaction vessel. Reaction is evidenced by the pressure drop within the vessel as the ethylene oxide is consumed. As the reaction progresses, the reaction rate tends to fall off. When this happens, increments of sodium hydride are added to keep the reaction going to a predetermined end point in terms of a molar ratio of ethylene oxide to hydroxy compound.

The temperature at which the process is operated is low for a polymerization of ethylene oxide, particularly for one which employs an o-tert.-butylphenolic compound. The high activity of the sodium hydride initiator permits the reaction to be conducted at temperatures of about 100°–140° C. without undue delay. Lower temperatures than 100° C. may be maintained, but the reaction is needlessly retarded. The important point is to obtain a satisfactory polymerization rate while keeping the reaction mass well below a temperature at which thermal degradation of the product occurs. Temperatures below 140° C. will normally accomplish this. A preferred temperature range is 120° C. to 130° C.

One of the advantages of this invention is that pressure is not critical. The reaction will proceed in an acceptable manner at atmospheric pressure at 0 p.s.i.g. However, it is preferred to use a pressure in the range of about 10 p.s.i.g. to 30 p.s.i.g. Maintenance of a pressure within this range serves to regulate a safe flow of ethylene oxide to the reaction chamber. The rate of flow of the ethylene oxide together with the total amount consumed indicates the rate and progress of the reaction and the points at which to add more sodium hydride initiator. Pressures in excess of 50 p.s.i.g. have not been advantageous and require more elaborate equipment to contain them.

At the end of the polymerization, when the ethylene oxide required to produce a polyoxyethylene compound of predetermined molecular weight has been reacted, part of the product is terminated with sodium oxy groups which are converted to hydroxy groups by acidification. Acidification is recommended because the polymer in the sodium alkoxide form is highly sensitive to oxidation. The conversion to hydroxy end groups is best done by stirring into the reaction mass glacial acetic acid equivalent to the sodium hydride added. The pH of a 5% aqueous solution of the acidified product should be between 4.5 and 7. The reaction mass is also effectively acidified with benzenephosphinic acid. Mineral acids may also be used in aqueous solution, but they are to be avoided when the residual water is troublesome in the subsequent use of the product. Usually the product will be used as it is obtained after acidification without removing the sodium salt of the neutralizing acid.

A convenient indicator of the quality of the product of the invention process is the ratio of the molecular weight of the product as determined by measuring its hydroxyl number and the molecular weight as calculated from the ethylene oxide consumed on a molar basis relative to the hydroxy compound. This ratio multiplied by 100 is called the attainment of the reaction and serves as a measure of the product quality. Theoretically, an attainment value of 100 would indicate the absence of shorter chain polymers in the condensation product. The presence of water in the ethylene oxide or its introduction into the reaction mass during polymerization by oxidative degradation lowers the measured molecular weight and thus lowers the figure denoting attainment of reaction.

For a clearer understanding of the invention, the following specific examples are given. These examples are intended to be merely illustrative of the invention and not in limitation thereof. Unless otherwise specified, all parts are by weight.

*Example 1*

A stainless steel reactor equipped with an agitator is swept with dry nitrogen and then charged with 59 parts of ethylene glycol having a water content of 0.04%, 21 parts of 4,4'-butylidenebis (6-tert.-butyl-m-cresol) having a water content of 0.05% (the combination of these hydroxy compounds representing 1 mol of material), and 0.46 part of a 52% dispersion of sodium hydride in white mineral oil (representing 0.01 mol of sodium hydride). The temperature of the reaction zone is raised to 120° C.

and held between 120° and 130° C. throughout the reaction. Ethylene oxide, previously dried to a moisture content of 3 p.p.m. (0.0003%), is pumped to the reactor and the pressure allowed to increase to 20 p.s.i.g. The flow is continued at this pressure until 642 parts (14.6 mols) are added over a period of 4 hours. Because of size limitation in the apparatus, three-fourths of the reactor charge is transferred to a tank and held under nitrogen for subsequent reaction in a separate operation. The remaining quarter of the charge, 180.6 parts (0.25 mol of hydroxy compounds), is reacted at 90°–100° C. under dry nitrogen with 0.345 part of 52% sodium hydride dispersion (0.0075 mol of sodium hydride) and then with ethylene oxide at 20–30 p.s.i.g. and 125±° C. until 495 parts have been absorbed. The reaction mass is then transferred to a larger stainless steel reactor, blanketed with dry nitrogen, and is treated with 0.92 part (0.02 mol) of sodium hydride dispersion at 90°–120° C. The reactor pressure is reduced to 50–100 mm. absolute mercury pressure and ethylene oxide is again introduced, the pressure being allowed to rise to 30 p.s.i.g. Reaction is continued at 30 p.s.i.g. and 125±5° C. until 1700 parts (38.65 mols) of ethylene oxide has been added. An additional 1.03 parts (0.0223 mol) of sodium hydride dispersion is supplied to the reactor and ethylene oxide addition is continued at 20–30 p.s.i.g. and 125±5° C. until 3400 parts more ethylene oxide (77.25 mols) have reacted. The reaction mass is acidified with 3.5 parts of glacial acetic acid as the temperature is allowed to drop to 100°–110° C. The mixture is agitated under nitrogen for 4–6 hours to insure thorough mixing. The pH of a 5% aqueous solution of the final product is 5.8. The polyethylene glycol obtained [the reaction product of 1 mol of mixed ethylene glycol and bis(phenol) and 523 mols of ethylene oxide] is a colorless solid having a freezing point of about 75° C. and a number average molecular weight determined by hydroxyl number of 21,200. The attainment of the reaction is 92%, i.e., $$\frac{\text{measured mol. wt. (21,200)}}{\text{calculated mol. wt. (23,100)}} \times 100$$

The partially polymerized material stored in the nitrogen-blanketed tank is divided into three parts and reacted as described in this example until a total of 23,100 parts of polymer have been produced.

*Example 2*

A glass reactor is swept with dry nitrogen and then charged with 310 parts (representing 5 mols) of ethylene glycol having a water content of 0.04% and 1.15 parts of a 52% dispersion of sodium hydride in white mineral oil (representing 0.025 mol). The charge is blanketed with nitrogen and heated to 110° C. A mixture of ethylene oxide vapor and nitrogen (dried to 3 p.p.m. of moisture) is introduced under the surface of the charge and the temperature is adjusted to 125±5° C. Ethylene oxide addition is continued until the charge in the flask has increased in weight by 704 parts (16.0 mols. of ethylene oxide absorbed). There is withdrawn from the reactor 415 parts of polyethylene glycol (molecular weight 203) and the remainder is reacted as above with 0.68 part (0.0149 mol) of sodium hydride dispersion and 1348 parts (30.65 mols) of ethylene oxide. At this point, 1049 parts of the polymer (mol. wt. 657) are removed, and the remainder is reacted with 1.89 parts (0.0411 mol) of sodium hydride dispersion and 1676 parts (38.11 mols) of ethylene oxide. Of the resulting polymer (mol. wt. 1880), 1978 parts are withdrawn, and the remainder is reacted with 0.734 part (0.016 mol) of sodium hydride dispersion and with 1171 parts (26.62 mols) of ethylene oxide to give polymer with molecular weight 5550. After discharge of 949 parts of the polymer, the remainder is reacted with 0.966 part (0.021 mol) of 52% sodium hydride and with 2088 parts (47.48 mols) of ethylene oxide. A total of 2777 parts of the new polymer (mol. wt. 19,471; 0.143 mol) is reacted as before with 1.84 parts (0.04 mol) of 52% sodium hydride and with 1954 parts (44.45 mols) of ethylene oxide. The product is cooled under a nitrogen blanket to 110° C. and is acidified with 12.3 parts of benzene phosphinic acid; the mixture is agitated for about 4 hours at 110°–120° C. under nitrogen to insure thorough mixing. The pH of a 5% aqueous solution of the final product is 4.7. The polyethylene glycol obtained represents the polymer from one mol of ethylene glycol and 753 mols of ethylene oxide; this polymer is a colorless solid having a freezing point of about 80° C. and a number average molecular weight determined by hydroxyl number of 32,100. The attainment of the reaction is 96.5%.

Using the procedure of Example 2 but substituting 550 parts of p-nonylphenol having a water content of 0.2% (representing 2.5 mols), a p-nonylphenyl polyethylene glycol representing the reaction product of 1 mol of nonylphenol and 467 mols of ethylene oxide is prepared. The colorless polymer has a freezing point of about 75° C. and a number average molecular weight of 20,100. The attainment is 97%. The condensation product has the average formula

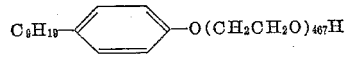

By the procedure of Example 1 or Example 2 various other hydroxy compounds and mixtures of hydroxy compounds listed in the following table are condensed with ethylene oxide (dried to a water content of 10 p.p.m. maximum) to produce polyoxyethylene compounds. The mol fraction of the hydroxy compounds in a mixture, the total amount of sodium hydride used in terms of the fraction of a mol per mol of hydroxy compounds, and the final molecular weight of the product as measured by the hydroxyl number are also given. The hydroxy compounds were analyzed for water, and when necessary water was removed so that there was less than 0.2% water in the material introduced to the reaction zone. These reactions produce compounds having the general formulas $RO(CH_2CH_2O)_nH$ when ethylene glycol, an alkanol, or a phenol is the reactant and $$H(OCH_2CH_2)_{n_1}ORO—(CH_2CH_2O)_{n_2}H$$

when the hydroxy compound is the alkylidene or thio bis-type of phenolic compound wherein $n$ and $n_1+n_2$ is essential equal to the number of mols of ethylene oxide per mol of hydroxy compound pumped to the reactor.

| Example | Hydroxy Compound | Mol Fraction of Hydroxy Compound | Mols Ethylene Oxide per Mol Hydroxyl Compounds | Amount of Sodium Hydride Mol per Mol of Hydroxy Compound | Calculated Number Average Molecular Weight (A) | Number Average Molecular Weight of Polyoxyethylene Product (B) | Attainment in Percent B/A×100 |
|---|---|---|---|---|---|---|---|
| 3 | 1-hexanol | 1.0 | 505 | 0.30 | 22,300 | 17,500 | 78 |
| 4 | 4,4'-isopropylidenediphenol | 1.0 | 524 | 0.30 | 23,300 | 23,100 | 99 |
| 5 | 2,6-di-tert.-butyl-p-cresol | 1.0 | 630 | 0.30 | 28,000 | 20,000 | 71 |
| 6 | Ethylene glycol / 4,4'-isopropylidenediphenol | 0.8 / 0.2 | 548 | 0.30 | 24,200 | 23,400 | 97 |
| 7 | Ethylene glycol / 2,2'-methylenebis(6-tert.-butyl-p-cresol) | 0.87 / 0.13 | 525 | 0.23 | 23,200 | 22,100 | 95 |

| Example | Hydroxy Compound | Mol Fraction of Hydroxy Compound | Mols Ethylene Oxide per Mol Hydroxyl Compounds | Amount of Sodium Hydride Mol per Mol of Hydroxy Compound | Calculated Number Average Molecular Weight (A) | Number Average Molecular Weight of Polyoxyethylene Product (B) | Attainment in Percent B/A×100 |
|---|---|---|---|---|---|---|---|
| 8 | Ethylene glycol <br> 2,2'-ethylidenebis(6-tert.-butyl-p-cresol) | 0.87 <br> 0.13 | 521 | 0.21 | 23,000 | 19,900 | 87 |
| 9 | Ethylene glycol <br> 4,4'-thiobis(6-tert.-butyl-m-cresol) | 0.87 <br> 0.13 | 534 | 0.23 | 23,600 | 19,000 | 81 |
| 10 | Ethylene glycol <br> 4,4'-thiobis(6-tert.-butyl-m-cresol) condensed with 38.4 mols of ethylene oxide (aver. mol. wt. 2046). | 0.87 <br> 0.13 | 465 | 0.30 | 20,800 | 20,800 | 100 |
| 11 | Ethylene glycol <br> 4,4'-butylidene-bis(6-tert.-butyl-m-cresol) | 0.94 <br> 0.06 | 529 | 0.30 | 23,400 | 23,100 | 99 |
| 12 | Ethylene glycol <br> 2,6-di-tert.-butyl-p-cresol | 0.69 <br> 0.31 | 480 | 0.22 | 21,300 | 17,880 | 84 |
| 13 | Phenol <br> 4,4-thiobis(6-tert.-butyl-m-cresol) | 0.89 <br> 0.11 | 528 | 0.30 | 23,300 | 17,900 | 77 |
| 14 | p-Nonylphenol <br> 2,6-di-tert.-butyl-p-cresol | 0.72 <br> 0.28 | 592 | 0.53 | 26,300 | 21,600 | 82 |
| 15 | p-Nonylphenol <br> 3,5-di-tert.-butyl-4-hydroxybenzyl alcohol | 0.91 <br> 0.09 | 483 | 0.53 | 21,500 | 19,330 | 90 |
| 16 | Ethylene glycol | 1.0 | 878 | 0.34 | 38,700 | 34,600 | 89 |

A number of advantages of the present invention have been previously pointed out. One further advantage that should be mentioned is the fact that it provides a low-temperature, low-pressure process for incorporating into the polymer chain the hydroxy compound which will impart anti-oxidant properties to the polymer. Heretofore, when ethylene oxide was condensed with a hindered phenol to provide a polyoxyethylene compound containing a built-in anti-oxidant, such as 2,6-di-tert.-butyl-p-cresol, the temperature and pressure conditions for the reaction have been so severe that degradation of the high molecular weight polymer occurred.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. In the condensation of ethylene oxide with an organic hydroxy compound selected from the group consisting of alcohols, phenols, ethers of polyethylene glycol having a molecular weight up to 3000 and mixtures of these hydroxy compounds followed by neutralization of the condensation product, the improvement which comprises reacting in a substantially anhydrous atmosphere in the proportion of 1 mol of hydroxy compound having a water content of less than 0.2%, about 360–800 mols of ethylene oxide having a water content of less than 0.005% and about 0.005 mol to 0.6 mol of sodium hydride at a temperature of about 100° C. to about 140° C.

2. The process of claim 1 in which the ethylene oxide has a water content of less than 0.002%.

3. In the condensation of ethylene oxide with a phenol followed by neutralization of the condensation product, the improvement which comprises reacting in a substantially anhydrous atmosphere in the proportion of 1 mol of phenol having a water content of less than 0.2%, about 360–800 mols of ethylene oxide having a water content of less than 0.005% and about 0.6 mol of sodium hydride at a temperature of about 100° C. to about 140° C.

4. The process of claim 3 in which the phenol is p-nonyl.

5. In the condensation of ethylene oxide with an alcohol followed by neutralization of the condensation product, the improvement which comprises reacting in a substantially anhydrous atmosphere in the proportion of 1 mol of alcohol having a water content of less than 0.2%, about 360–800 mols of ethylene oxide having a water content of less than 0.005% and about 0.3 mol of sodium hydride at a temperature of about 100° C. to about 140° C.

6. The process of claim 5 in which the alcohol is ethylene glycol.

7. A process for the condensation of ethylene oxide with an organic hydroxy compound which comprises reacting under substantially anhydrous conditions and at temperatures of 100°–140° C. ethylene oxide having a water content of less than 0.005%, sodium hydride, and a mixture of ethylene glycol and 4,4'-butylidene-bis(6-tert.-butyl-m-cresol), said mixture having a water content of less than 0.2%, the reacting proportions being about 360–800 mols of ethylene oxide and about 0.005–0.6 mol of sodium hydride per mol of said mixture, and neutralizing the condensation product thus obtained.

8. A process for the condensation of ethylene oxide with an organic hydroxy compound which comprises reacting under substantially anhydrous conditions and at temperatures of 100°–140° C. ethylene oxide having a water content of less than 0.005%, sodium hydride, and a mixture of p-nonylphenol and 2,6-di-tert.-butyl-p-cresol, said mixture having a water content of less than 0.2%, the reacting proportions being about 360–800 mols of ethylene oxide and about 0.005–0.6 mol of sodium hydride per mol of said mixture, and neutralizing the condensation product thus obtained.

References Cited by the Examiner

UNITED STATES PATENTS 2,897,163  7/1959  Clark et al. _____ 260—2

WILLIAM H. SHORT, *Primary Examiner.*

T. E. PERTILLA, *Assistant Examiner.*